United States Patent Office 3,677,961
Patented July 18, 1972

3,677,961
GALACTOMANNAN COMPOSITION AND TREATMENT FOR THE PREVENTION OF THIXOTROPHY DESTRUCTION OF SAME BY LIGANDS
William C. Browning, Alphonse C. Perricone, and Katherine Anne C. Elting, Houston, Tex., assignors to Milchem Incorporated, Houston, Tex.
No Drawing. Filed Dec. 28, 1970, Ser. No. 102,270
Int. Cl. B01j *13/00*
U.S. Cl. 252—316    23 Claims

ABSTRACT OF THE DISCLOSURE

The present invention relates to a method and composition for the prevention of the destruction of thixotropic structure in metal ion cross-linked galactomannan solutions when said solutions are exposed to an organic polyelectrolyte ligand as hereafter defined by introducing into the cross-linked galactomannan structure a bacterially modified carbohydrate in an amount sufficient to maintain the desired cross-linked structure in the presence of the ligand.

BACKGROUND OF THE INVENTION

(1) Field of the invention

The invention relates to a composition and process for the prevention of the destruction of the thixotropic gel structure of metal ion cross-linked galactomannan solutions which are exposed to organic polyelectrolyte ligands, such as lignin-containing materials. The composition and process for the prevention of the destruction of the gel structure permits the selected galactomannan material to be utilized as a shear thinning thixotropic viscosifier for a variety of industrial applications, such as in the drilling of subterranean wells and the like.

(2) Description of the prior art

Hydrophilic vegetable galactomannan gums have been known and utilized for a variety of industrial applications for many years. For example, they are readily utilized in aqueous solutions in many manufacturing processes such as textile, cosmetic, foodstuff, and the drilling and secondary production of subterranean wells. These materials are a product of nature and are somewhat related structurally to sugars and carbohydrates. Of particular importance is their ability to form viscous colloidal dispersions in aqueous environments believed to result from the thickening of the aqueous portion of the system by means of particle water absorption and swelling of the colloid. Even in small quantities, the addition of the gum will cause an immediately apparent increase in viscosity and, in some instances, a gel structure will develop. This gel formation is especially desirable when small, undissolved solids are present in an environment, and must be maintained in a relatively uniform state of dispersion after agitation has been reduced or terminated either temporarily or permanently. Such a condition evolves from the drilling of subterranean wells for oil, gas, water, and the like. One of the most versatile hydrophilic vegetable gums is the galactomannan gum, a species of which is guar gum. This gum has an extremely high tolerance for the presence of electrolytes and for this reason may be used in a variety of aqueous environments.

To enhance thixotropic and pseudoplastic characteristics and enable greater "viscosities" to be developed from a given amount of the galactomannan material in solution, the phenomenon of "cross-linking" may be utilized. Linear polymer chains can be joined together by materials having two or more functional groups. When molecules are connected together in this manner the molecules are said to be cross-linked. These cross-links may be formed by covalent, ionic-coordination or hydrogen bonds. The less stable cross-linking bonds can be broken by small amounts of heat or shearing stress. The vulcanization of rubber is a classic example of more permanent chemical cross-link bonding. Weaker bonding, such as achieved through hydrogen bonding, induces only a labile structure that is easily disrupted by mechanical force. If a thixotropic supporting structure is to be provided by the galactomannan solution, then a cross-linked supporting network must be established. The cross-link bond, however, must be sufficiently weak to break under shear but reform very quickly as the rate of shear is decreased.

In many instances metal complexes are thought to be formed from adjacent hydroxyl groups which are said to be cis to each other. In almost all cases both cationic and anionic complexes are formed in alkaline solutions and are believed to primarily involve polyhydroxy anions and multivalent cations.

Treatment of a galactomannan solution with, for example, a chromic ion metallic cross-linking agent will produce a three-dimensional, complex-linked gel network. The rigidity of the resulting gel is proportional to the concentration of cross-links formed, and the concentration of cross-links formed is dependent on the square of the concentration of galactomannan gum at the time of gelation.

Under some circumstances, it may be desirable to cross-link a galactomannan gum in a controlled or buffered manner by utilizing a cross-linking chelation phenomena. The term chelate was originally proposed to designate those cyclic structures which arise from the union of metallic atoms with organic and inorganic molecules or ions. If a molecule is to function as a chelating agent, it must fulfill at least two conditions. First, it must possess two appropriate functional groups. It must possess donor atoms which are capable of combining with a metal atom by donating a pair of electrons. These electrons may be contributed by basic coordinating groups such as $NH_2$ or acidic groups that have lost a proton. Second, these functional groups must be so situated in the molecule that they permit the formation of a ring with the metal atoms as the closing member. The donor group is termed a ligand and the metal atom the acceptor. Chelates can only be formed by ligands that have more than one point of attachment to the metal. Therefore, a bidentate or polydentate ligand can form a chelate, but an unidentate ligand cannot form a chelate. Thus, for example, an unidentate sulfonic acid salt is not by definition a chelate.

Attempts have been unsuccessful in providing buffered ion polyelectrolyte chelation with galactomannan gums. For example, a chromic ion has been attempted to be utilized as the metal atom or acceptor and a lignin-containing material as the donor or ligand substance. The results of these attempts have been breakdown in the thixotropic structure of the galactomannan base rendering the gum incomptable and unsuccessful as a viscosity-building material.

We have found that by reacting a galactomannan gum in the presence of a bacterially modified carbohydrate before introduction of the buffered cross-linking structure, a controlled reaction will take place in such a fashion as to render the galactomannan compatible in the presence of the ligand material to provide a buffered, cross-linked product.

It is, therefore, an object of the present invention to provide a process for reacting galactomannan gum in the presence of a ligand to form a thixotropic substance.

It is a further object of the present invention to provide a stabilized galactomannan gum—bacteria-modified carbohydrate—ligand reaction product as a commercial viscosity building structure.

Other objects and advantages of the present invention will be apparent from a reading of the specification, the examples and the claims which follow.

SUMMARY OF THE INVENTION

The present invention relates to a method and composition for the prevention of the destruction of thixotropic structure in metal ion cross-linked galactomannan solutions when said solutions are exposed to an organic polyelectrolyte ligand as hereafter defined by introducing into the cross-linked galactomannan structure a bacterially modified carbohydrate in an amount sufficient to maintain the desired cross-linked structure in the presence of the ligand.

DESCRIPTION OF THE PREFERRED EMBODIMENTS

When referring to a "bacterially modified carbohydrate," we mean to refer to the bacterially modified gums or polysaccharides technically employed in industry. Of particular interest are modified carbohydrates produced by bacterial action of the genus Xanthomonas. These bacteria may be of the species *Xanthomonas begoniae, Xanthomonas campestris, Xanthomonas carotae, Xanthomonas corylina, Xanthomonas gummisudans, Xanthomonas hederae, Xanthomonas incanae, Xanthomonas lespedezae, Xanthomonas malvacearum, Xanthomonas holcicola, Xanthomonas papavericola, Xanthomonas phaseoli, Xanthomonas pisi, Xanthomonas translucens, Xanthomonas vasculorum, Xanthomonas vesicatoria*, and the like. This material may be obtained by utilizing methods such as those disclosed in U.S. Pats. Nos. 3,000,790, 3,020,206, 3,228,855, 3,455,786, and 3,485,719. These particular carbohydrates appear to be a relatively high molecular weight linear polymer with a beta-linked backbone containing D-glucose, D-mannose, and D-glucuronic acid with a mannose side chain for every eight sugar residues and a possible 4,6-0 (1-carboxy-ethylidene) D-glucose side chain residue for every 16 sugar residues. These carbohydrates contain about 3.0 to 3.5% pyruvic acid as a structural component attached to the glucose moiety in ketal linkage. Acetic acid is also present as the O-acetyl ester in an amount of about 4.7%. It is believed that the pyruvate-ketal linkage in the carbohydrate involves two glucose units in a unique structure. Studies have indicated that side chains are present in size and steric proportions equivalent to that of a non-reducing side-chain residue. The combined effect confers upon the carbohydrate the character of a linear polymer with seven protruding side chains for every 16 sugar residues. The indications are that few, if any, long side chains are present.

Solution viscosities of this carbohydrate are relatively insensitive to charge-neutralizing effects of inorganic electrolytes and although not fully understood, it is believed that structural and steric factors are primarily responsible. In accord with this theory, the large number of side chains limits the flexibility of the carbohydrate chain and thus promotes shear-thinning behavior. The observed increases in viscosity of more concentrated solutions of the carbohydrate may be due to an increase in inter-molecular association. The rather rigid carbohydrate chain remains in a more extended state which favors intermolecular association, as well as inter-molecular entanglement, to produce rheological structure. The side-chain groups, however, may limit the amount of intermolecular association by steric hindrance and prevent dehydration and precipitation of the polysaccharide by brines and other high electrolyte-containing waters.

By galactomannan substances generally, we mean to refer to gums such as guar gum, locust gum and those from endosperms of seeds of leguminous plants such as, for example, sennas, brazilwood, tara, honey locust, alfalfa gum, clover gum and the like. The most important of these is guar gum which is the milled endosperm from the seeds of the plant *Cyamposis tetragonolobus* also of the family Leguminosa. Guar gum, as stated above, has a high tolerance for dissolved electrolytes and will produce high-viscosity systems in water and salt or brine solutions. Gelation of this gum occurs only at comparatively high concentrations of guar. As a result, cross-linking agents are used to form a gel having properties not obtainable by the use of the gum alone. Use of a cross-linking agent will also reduce the amount of guar gum needed to obtain a desired gel. As used herein, a gel is a mixture, one component of which is water, homogenous down to substantially colloidal dimensions and capable of resisting a finite shearing stress.

By organic polyelectrolyte ligands we mean to refer to those naturally occurring materials containing reactive groups capable of forming metal chelates. For example, lignin-containing materials such as kraft lignin, soda lignin, polyphenolic tannins and polyflavonoids may function as suitable ligands. Lignosulfonates in which the sulfonic groups have been prereacted and saturated with sodium or ammonium ions are especially useful as ligands in the practice of the present invention. Lignin-containing materials are readily available as by-products of chemical processes making chemical wood pulp or wood cellulose which are used to make paper and other products. The processes generally used to chemically extract the cellulose from the wood, leaving the lignin from the wood in the waste liquor, are the sulfate process, and the bisulfite or sulfite process. In general, any type of wood or lignocellulosic material which can be resolved into cellulose pulp by one of these two processes may be used as an organic polyelectrolyte ligand for use in a buffered metal ion chelate for cross-linking galactomannan materials.

For reasons of economy, we prefer to utilize a sulfonated lignin-derived polymer which can be prepared by cooking wood chips with a sodium bisulfite or by adding sodium salts to calcium sulfite waste liquor in a manner calculated to cause a precipitation of the calcium ion and thereby forming the sodium salt of lignosulfonic acid. A sulfonated lignin-derived polymer obtained from basic calcium lignosulfonate made in accordance with the procedures disclosed in patents such as U.S. Reissue Pats. Nos. 18,268 and 18,369, may be used. The calcium lignosulfonate is converted to the sodium salt by reaction of the sulfonic groups of the lignosulfonates with stoichiometric equivalent amounts of sodium salts, the anions of which will form water insoluble salts such as sodium phosphate, sodium fluoride, sodium oxalate, and sodium carbonate and sodium sulfate. Other salts of lignosulfonates may also be used.

Although preferred, it is not essential in the practice of the present invention that sulfonated lignin-containing materials be used, for it has been found that practically any material containing reactive groups capable of forming a metal chelate may be used in the practice of the present invention. Moreover, natural tannin-containing polyelectrolytes, such as wattle extract or quebracho, may also be used as an organic polyelectrolyte ligand. Bark extracts derived by bisulfite cooking of hemlock, redwood, douglas fir, and similar barks may also be used. The teachings of patents, such as U.S. Pats. Nos. 2,890,231 and 2,938,893 or similar known processes, may be used to obtain a satisfactory bark extract as the organic polyelectrolyte ligand.

The stabilities of complexes are greatly increased by the coordination of polydentate ligands. Organic polyelectrolytes, such as lignin-derived polymers having a large number of various ligand groups attached to the backbone of the marcromolecule, are capable of forming a wide variety of chelate complexes, the properties of which will be determined by the nature of the macromolecule and the properties of the chelated metal. The first series of the transition elements is particularly active in the formation of chelate structures utilized for cross-linking galactomannan materials.

Of the first series of transition metals, chromium is of special interest. Although thousands of trivalent chromium complexes are recorded, there is no authenticated exception to the rule that trivalent chromium is necessarily hexacoordinate. The coordination bonds of trivalent chromium ion are noted for their unusual strength, and this six-coordinate structure lends itself to the formation of organic chelates, complexes and polynuclear complexes having the probability of enhanced cross-linking depending upon the specific manner of preparing the material.

The particular process incorporated in the present invention utilizes varying proportions of the bacterially-modified carbohydrate. The necessary amount which will be effective to render the galactomannan compatible to the presence of the ligand will depend on the selected carbohydrate, the ligand at hand, the analytical content of the aqueous solution, the metal cross-linking material, the amount of gel or thixotropic structure desired and the desired industrial application. It is therefore not possible to state the minimum amount necessary to be utilized under all circumstances. Those skilled in the art will be able to readily determine the amount needed by conducting preliminary laboratory testing. Such tests should preferably be conducted with aliquot samples of the gum. Varying amounts of carbohydrate are added to the gum samples. The desired proportion of metal-ion cross-linking agent is added to the sample and the pH adjusted to from about 7 to about 10. The sample containing the minimum amount of carbohydrate which produces the desired gel characteristic may be used to establish the treating proportion for the particular composition. Adjustments and proportions should then be calculated to obtain the necessary amount of carbohydrate to produce the desired gel in the presence of the ligand. Under some conditions a 1-to-5 carbohydrate-to-gum ratio should be effective to render the gum compatible with the selected ligand. At any rate, an amount of the bacterially modified carbohydrate sufficient to at least prevent the destruction of the desired gel formation from occurring should be utilized. Gel strength may be determined by utilizing a Fann viscometer. Fann viscometers are of the concentric cylinder type where the test fluid is contained in an annular space between cylinders. Rotation of the outer cylinder at known velocities is accomplished through precision gearing, causing a torque to be transmitted to the inner cylinder by the viscous drag of the fluid. This torque is balanced by a helical spring, and angular deflection is read from a dial or through suitable sensors on a meter or recorder. The amount of torque at a given r.p.m. is indicated in arbitrary degrees Fann, which may be converted into viscosity or apparent viscosity by appropriate calculation. The initial gel strength of a particular sample is determined by shearing the sample at 600 r.p.m. for five seconds. The sample is then allowed to stabilize for ten seconds. A reading of initial gel strength is then taken by shearing the sample at 3 r.p.m. and obtaining the Fann reading. Ten minutes are then allowed to lapse before the "ten minute gel strength" is obtained by again observing the Fann reading at 3 r.p.m. In order to assure that a proper gel structure is developing in the carbohydrate-gum cross-linked structure, the ten minute gel strength should be greater than the initial, or ten second, gel reading. Generally speaking, for most industrial applications, the ten minute gel reading should be at least about 2. When using the carbohydrate-gum cross-linked structure in an aqueous drilling fluid, a ten minute gel of from about 10 to about 20 should be sufficient under most circumstances. In our laboratory work we have found that when using a *Xanthomonas campestris*-modified carbohydrate and a lignosulfonate ligand, a 6-to-5 carbohydrate-to-gum ratio will be sufficient to provide adequate thixotropy and controlled cross-linking for the purposes of utilizing the material, for example, in the drilling of subterranean wells.

After the particular carbohydrate and ligand have been selected and the ratio of additives determined, the gum and the carbohydrate are blended. This may be done in a variety of ways and our invention is not dependent on the particular process or step utilized to mix or blend the reactants. For reasons of convenience, we prefer to dry blend the carbohydrate and the gum at the selected ratio before hydration in the aqueous solution. The amount of carbohydrate and gum sufficient to provide adequate gel strength as herebefore described should be at least about .2% by volume of the total aqueous solution. Higher concentrations will achieve greater gel strengths, and the selected concentration will normally be dependent on economic considerations. The aqueous portion of the solution may be tap water, distilled water, water containing large amounts of electrolytes or brines or mixtures thereof. Determining how much aqueous solution to use will depend on the desired amount of thixotropy necessary for the particular application at hand. It is very desirable, however, to thoroughly mix the reactants during the hydration step. In the laboratory, this can be accomplished by utilizing an electric blender of the type which subjects the solution to a high rate of shear. After hydrating the aqueous solution the metal ion cross-linking agent is added in the selected quantity. The amount of cross-linking agent utilized will vary with the particular application and the needed thixotropy. Our invention does anticipate the use of a chelate complex formed as discussed above. This material is utilized in order to provide a controlled or buffered cross-linking of the galactomannan structure. The actual cross-linking is achieved by the selected metal-ion-containing material, i.e., chrome acetate, chrome sulfate, and the like. The buffering action is acomplished by the use of the ligand structure. The quality and quantity of ligand selected will again depend on the amount of buffering action required for the particular industrial application. Generally speaking a 1-to-1 to 1-to-24 carbohydrate-gum—to—metal-ligand cross-linking agent ratio will suffice to produce adequate thixotropy. When utilizing the resulting composition as an aqueous drilling fluid additive, about a 1 p.p.b. to 6 p.p.b. ratio of additive to aqueous medium should suffice under normal circumstances.

After the cross-linking material has been added to the aqueous carbohydrate-gum suspension, the pH is adjusted to from about 7.0 to about 10.0 with sufficient amounts of sodium hydroxide or other appropriate alkali. PH adjustment is preferably made in two stages in order to permit sufficient time for complete cross-linking. The pH is first adjusted to about 7.0 and then the solution is permitted to stand for a brief period before the pH is again adjusted to 9.0. pH adjustments are necessary to conduct proper an deffective cross-linking of the suspension.

The present invention is further illustrated by the examples which follow. In the examples the bacterially modified carbohydrate is the product of the action of the bacteria *Xanthomonas campestris* on a carbohydrate and is commercially available as "Kelzan XC Polymer" made by Kelco Company of San Diego, Calif. The galatomannan utilized is guar gum and is commercially available as "GenGel" manufactured by General Mills Chemicals, Incorporated, of Minneapolis, Minn.

EXAMPLE I

The present example demonstrates a preferred process for obtaining the organic polyelectrolyte ligand utilized in the examples below. Thirteen thousand five hundred (13,500) kg. of sodium lignosulfonate liquor of about 38% solids is pumped to a drum reactor. Three hundred (300) kg. of ammonium hydroxide is added below the surface of the sodium lignosulfonate liquor to obtain a pH of about 7.5 and to adequately destroy the sugar content of sodium lignosulfonate. After pH adjustment, the temperature of the reactor is raised to about 130° C. This process is continued for about 120 minutes.

Polymerization is initiated by injecting a solution of 2% formaldehyde in the circulation line while circulating the liquor. Upon the conclusion of formaldehyde injection, the temperature of the reaction mixture is maintained at 130° C. for an additional 45 minutes. The reactants are then cooled down to 70–80° C.

A 33% solution of magnesium chloride (340 liters) is slowly added to five hundred fifty-one (551) kg. of the desugared and polymerized sodium lignosulfonate solution. In order to provide a metal ion for the chelate structure, two hundred seventy (270) liters of a chrome sulfate solution is slowly injected into the liquor circulation line. After the complete addition of the chrome sulfate with the lignosulfonate, the mixture is agitated for about 30 minutes to insure complete reaction. The material is then spray dried.

EXAMPLE II

The present example demonstrates the ability of metal ions to effectively cross-link a galactomannan when an organic polyelectrolyte ligand is not present in the cross-linked structure. To 350 ml. of tap water was added 1.5 g. of guar gum. The guar solution was mixed in an electric blender for 10 minutes. To another guar solution of equivalent quantity was added chrome acetate in an amount of 0.5 p.p.b. (pounds per barrel) and mixed for an additional 10 minute period. The pH of the suspension was adjusted to 7.0 by the slow addition of sodium hydroxide. The samples were then allowed to stand static for 15 minutes. The pH of the samples was then adjusted to 9.0 with additional incremental additions of sodium hydroxide. In order to prevent biodegradation, a common occurrence in carbohydrate materials, 0.1 g. of "Dowicide G," a biochemical preservative manufactured by Dow Chemical Company was added.

The rheology of the samples was determined by utilizing a Model 39A Fann Viscometer at room temperature. After initial rheology was determined, the testing was repeated after hot rolling the samples in an oven at 150° F. for 16 hours, having a rotating carrier. The samples were then allowed to cool before Fann measurements were obtained. The results of this test indicated that the guar material was effectively cross-linked by the chromic ion and did not lose thixotropy upon exposure to higher temperatures over an extended test period. The tables below further illustrate the results of this test.

TABLE 2A.—GUAR GUM

|  | Degrees Fann | |
|---|---|---|
|  | Initial | After hot rolling |
| Fann, r.p.m.: |  |  |
| 600 | 35 | 34 |
| 300 | 25 | 24 |
| 200 | 20.5 | 19.5 |
| 100 | 15 | 13 |
| 6 | 3 | 2 |
| 3 | 2 | 1.5 |
| 10 minutes gel | 2 | 1.5 |

TABLE 2B.—CROSS-LINKED GUAR GUM

|  | Degrees Fann | |
|---|---|---|
|  | Initial | After hot rolling |
| Fann, r.p.m.: |  |  |
| 600 | 49 | 49 |
| 300 | 30 | 29.5 |
| 200 | 24 | 22.5 |
| 100 | 16.5 | 15 |
| 6 | 6 | 5 |
| 3 | 4 | 4 |
| 10 minutes gel | 21 | 6.5 |

EXAMPLE III

The present example demonstrates the inability of a galactomannan to retain thixotropy when it is cross-linked with a chromic ion material and an organic polyelectrolyte ligand, such as a lignin-containing material. A cross-linked guar gum solution was prepared as in Example II. The ligand material was prepared as in Example I. The ligand was added to the guar solution at 4 and 6 p.p.b. levels, respectively. Rheological measurements were again determined after hot rolling for 18 hours using the Fann Viscometer described above. The measurements were compared with the cross-linked guar gum showing good gel structure in Table 2B. The results of this test indicated that the cross-linked structure obtained as in Example II above was destroyed by the presence of the ligand at both the 4 p.p.b. and 6 p.p.b. levels. The results of this test are further illustrated in the table below.

TABLE 3A

|  | Degrees Fann | | |
|---|---|---|---|
|  | CLG[1] | CLG plus 4.0 p.p.b. ligand | CLG plus 6.0 p.p.b. ligand |
| Fann, r.p.m.: |  |  |  |
| 600 | 49 | 19 | 17 |
| 300 | 29.5 | 10.5 | 10 |
| 200 | 22.5 | 8.5 | 7 |
| 100 | 15 | 4 | 4 |
| 6 | 5 | 0.5 | 0.5 |
| Initial gel |  | 0 | 0 |
| 10 minutes gel | 6.5 | 0 | 0 |

[1] Cross-linked guar.

EXAMPLE IV

The present example demonstrates the ability of an addition of a bacterially modified carbohydrate to prevent the destruction of the thixotropic structure of a metal ion cross-linked galactomannan which has been exposed to a ligand. The ligand utilized was made as in Example I. The bacterially modified carbohydrate is the product of the action of the bacteria *Xanthomonas campestris* on a carbohydrate. The galactomannan is guar gum. Into 350 ml. tap water was slowly added blends of the bacterially modified carbohydrate and the guar gum. These solutions were mixed in an electric blender for 10 minutes. Into the solution was added the selected amount of the ligand material. The pH of the suspensions was then adjusted to 7.0 with appropriate amounts of sodium hydroxide. The samples were allowed to stand for 15 minutes after which the pH was again adjusted to 9.0 with incremental additions of sodium hydroxide. The samples were then hot rolled for 16 hours at 150° F. and cooled to room temperature before the rheology was determined, again using the Fann Viscometer as described above. The results of this test indicated that thixotropy was not adversely affected by the ligand when the bacterially modified material is present in the cross-linked guar gum structure. The table below further illustrates the results of this test. The suspensions illustrated in Table 4A contained the following proportions of additives: 0.5 p.p.b. bacterially modified carbohydrate; 0.8 p.p.b. guar gum; 4 p.p.b. organic polyelectrolyte ligand. The suspensions illustrated in Table 4B contained the following proportions of additives: 0.6 p.p.b. bacterially modified carbohydrate; 0.5 p.p.b. guar gum; and 6.0 p.p.b. of the organic polyelectrolyte ligand. The results of this test are illustrated in the tables which follow:

TABLE 4A 0.5 p.p.b. carbohydrate/0.8 p.p.b. guar/4 p.p.b. ligand

| Fann, r.p.m.: | Degrees Fann |
|---|---|
| 600 | 28 |
| 300 | 16 |
| 200 | 12 |
| 100 | 7 |
| 6 | 1.5 |
| 3 | 1 |
| Initial gel | -- |
| 10 minute gel | 2 |

TABLE 4B 0.6 p.p.b. carbohydrate/0.5 p.p.b. guar/6.0 p.p.b. ligand

| Fann, r.p.m.: | Degrees Fann |
|---|---|
| 600 | 42 |
| 300 | 31 |
| 200 | 26 |
| 100 | 19 |
| 6 | 7 |
| 3 | 6 |
| Initial gel | 10 |
| 10 minute gel | 30 |

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What we claim is:

1. A method of treating a galactomannan gum comprising blending a galactomannan gum with a modified carbohydrate produced by bacterial action of the genus Xanthomonas in a carbohydrate-to-gum ratio of from about 1-to-5 to about 8-to-5, said carbohydrate-gum blend being in an aqueous solution at a concentration of not less than about .2% by volume, cross-linking the blended product in said aqueous solution with a chelate cross-linking agent having a metal ion as the acceptor selected from the class consisting of the metals of the first series of the transition elements of the Periodic Table and an organic polyelectrolyte ligand as the donor, said ligand being a member selected from the class consisting of lignin-containing materials, natural tannin-containing polyelectrolytes and bisulfite bark extract derivatives, and adjusting the pH of said solution to from about 7.0 to about 10.0, the ten minute gel strength of the resulting cross-linked solution being at least about 2 and being greater than the initial gel strength as determined by using a Fann viscometer.

2. The method of claim 1 wherein the galactomannan gum is guar gum.

3. The method of claim 1 wherein the modified carbohydrate is the product produced by the action of the bacteria *Xanthomonas campestris* on the carbohydrate.

4. The method of claim 1 wherein the metal ion in the said chelate cross-linking agent is chromium.

5. The method of claim 1 wherein the organic polyelectrolyte ligand is a lignin-containing material.

6. The method of claim 5 wherein the organic polyelectrolyte ligand is a lignosulfonate.

7. The method of claim 6 wherein the organic polyelectrolyte ligand is sodium lignosulfonate.

8. The method of claim 1 wherein the ratio of modified carbohydrate-to-galactomannan gum is about 6-to-5.

9. The method of claim 1 wherein the ratio of modified carbohydrate-to-galactomannan gum is at least about 1-to-5.

10. A composition of matter consisting essentially of an aqueous solution of a modified carbohydrate produced by bacterial action of the genus Xanthomonas and a galactomannan gum in a carbohydrate-to-gum ratio of from about 1-to-5 to about 8-to-5 cross-linked by a metal ion buffered chelate cross-linking agent having a metal ion selected from the class consisting of the first series of the transition metal elements of the Periodic Table as the acceptor component and an organic polyelectrolyte ligand as a donor component, said ligand being a member selected from the class consisting of lignin-containing materials, natural tannin-containing polyelectrolytes and bisulfite bark extract derivatives, the ten minute gel strength of the cross-linked solution being at least about 2 and being greater than the initial gel strength as determined by using a Fann viscometer, and the pH of said cross-linked solution being from about 7.0 to about 10.0.

11. The composition of claim 10 wherein the said galactomannan gum is guar gum.

12. The composition of claim 10 wherein the said modified carbohydrate is the product of the reaction of the bacteria *Xanthomonas campestris* on the carbohydrate.

13. The composition of claim 10 wherein the said metal ion is chromium.

14. The composition of claim 10 wherein the organic polyelectrolyte ligand is a lignin-containing material.

15. The composition of claim 14 wherein the organic polyelectrolyte ligand is a lignosulfonate.

16. The composition of claim 14 wherein the organic polyelectrolyte ligand is sodium lignosulfonate.

17. In the method of preventing the destruction by an organic polyelectrolyte ligand selected from the class consisting of lignin-containing material, natural tannin-containing polyelectrolytes and bisulfite bark extract derivatives, of the gel formation in a galactomannan gum aqueous solution having a metal ion-containing cross-linking agent selected from the class consisting of the first series of the transition metal elements of the Periodic Table, the steps of adding to said solution a modified carbohydrate produced by bacterial action of the genus Xanthomonas in a carbohydrate-to-gum ratio from about 1-to-5 to about 8-to-5, cross-linking said solution, and adjusting the pH of said solution to from about 7.0 to about 10.0.

18. The steps of claim 17 wherein the said galactomannan gum is guar gum.

19. The steps of claim 17 wherein the modified carbohydrate is the product of the reaction of the bacteria *Xanthomonas campestris* on a carbohydrate.

20. The steps of claim 17 wherein the said metal ion is chromium.

21. The steps of claim 17 wherein the said organic polyelectrolyte ligand is sodium lignosulfonate.

22. The steps of claim 21 wherein the said organic polyelectrolyte ligand is a lignin-containing material.

23. The steps of claim 21 wherein the said organic polyelectrolyte ligand is a lignosulfonate.

References Cited

UNITED STATES PATENTS

| 3,243,000 | 3/1966 | Patton et al. | 252—8.5 A X |
| 3,301,723 | 1/1967 | Chrisp | 252—316 X |
| 3,555,006 | 1/1971 | Storfer | 252—316 X |

RICHARD D. LOVERING, Primary Examiner

U.S. Cl. X.R.

252—8.5 A, 8.5 C; 260—Dig 4, Dig 31

UNITED STATES PATENT OFFICE
CERTIFICATE OF CORRECTION

Patent No. 3,677,961                     Dated July 18, 1972

Inventor(s) William C. Browning, Alphonse C. Perricone, and Katherine Anne C. Elting It is certified that error appears in the above-identified patent and that said Letters Patent are hereby corrected as shown below:

Col. 1, in the title, change the word "THIXOTROPHY" to --THIXOTROPY--.

Signed and sealed this 23rd day of April 1974.

(SEAL)
Attest:

EDWARD M. FLETCHER, JR.
Attesting Officer

C. MARSHALL DANN
Commissioner of Patents